Nov. 12, 1935.  F. W. HILD  2,020,945
MOTOR CONTROL SYSTEM
Filed Feb. 18, 1925  2 Sheets-Sheet 1

WITNESSES:

INVENTOR
Frederic W. Hild.
BY
ATTORNEY

Nov. 12, 1935.      F. W. HILD      2,020,945
MOTOR CONTROL SYSTEM
Filed Feb. 18, 1925      2 Sheets-Sheet 2

WITNESSES:

INVENTOR
Frederic W. Hild.
BY
ATTORNEY

Patented Nov. 12, 1935

2,020,945

UNITED STATES PATENT OFFICE 2,020,945

MOTOR CONTROL SYSTEM

Frederic W. Hild, Los Angeles, Calif.

Application February 18, 1925, Serial No. 9,999

2 Claims. (Cl. 255—19)

My invention relates to systems of motor control and it has particular relation to such systems as are employed in connection with earth drilling, machine tools and similar applications.

An object of my invention is to provide electrical means for controlling certain functional operations that are mutually interdependent, such, for example, as earth boring operations.

Another object of my invention is to provide electrical means for automatically feeding the working tool and for varying the pressure thereon in accordance with the resistance met in the operation.

Certain prior systems employ mechanical devices comprising differential-gear mechanisms for controlling the drilling pressure in accordance with the load, whereas, in accordance with my invention, the equipment is greatly simplified by employing an alternating-current motor of the induction type that is provided with two rotors and so arranged as to provide an electrical differential action.

One of the rotors is adapted to impart rotary movement to the drilling tool, while the second rotor provides for longitudinal movement of the tool so as to vary the drilling pressure in accordance with the load imposed.

Figure 1:
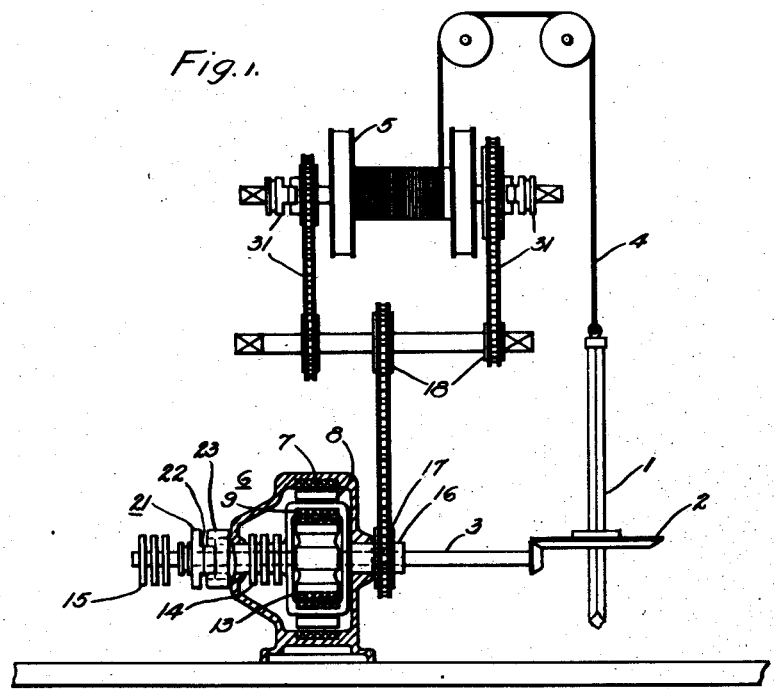

My invention will be best understood by reference to the accompanying drawings, in which Figure 1 illustrates certain of the mechanical features that are employed in connection with rotary earth-drilling, to which my invention is applied.

Figure 2:
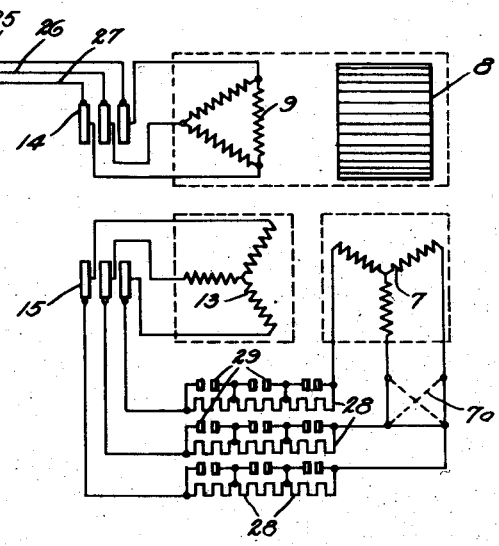
Figure 3:
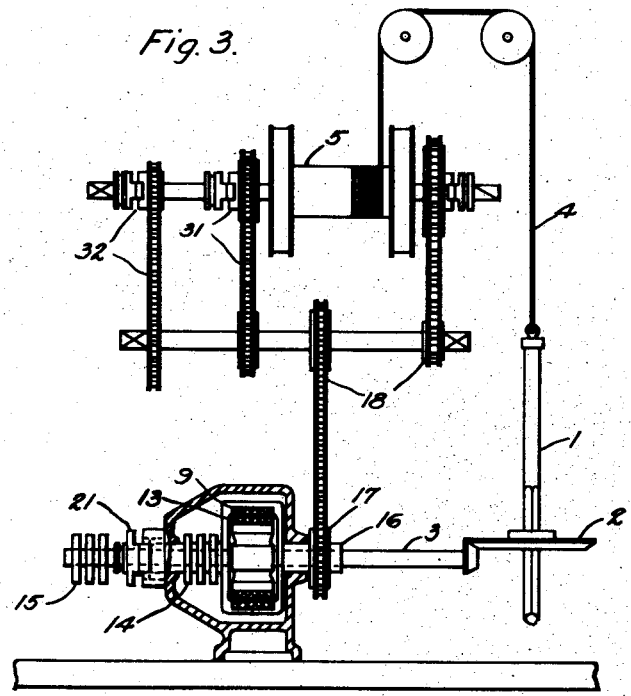

Fig. 2 is a diagrammatic representation of circuits and apparatus embodying my invention, and Fig. 3 is another embodiment of my invention.

Referring to Fig. 1, a rotary drilling tool 1 is arranged to be operated by a rotary mechanism comprising a table 2 that is driven by a motor shaft 3. The tool is suspended by means of a cable 4 that is wrapped about a hoisting drum 5, by means of which the tool may be lowered as the drilling progresses. The operating means comprises an induction motor 6 having a stator primary winding 7, and a rotor that is provided with a secondary winding 8 and a second primary winding 9.

A second rotor is co-axially related to the first-named rotor and comprises a secondary winding 13 assembled to cooperate with the primary winding 9. Slip rings 14 are adapted to connect the winding 9 to a source of energy, and the secondary winding 13 is brought out to slip rings 15 in a familiar manner, in order that external resistors may be connected in circuit therewith. The secondary winding 8 is preferably of the squirrel-cage type.

As illustrated, the rotor having the winding 13 is provided with a shaft 3 for rotating the table 2 and the other, or outer rotor, is mounted upon a hollow shaft 16, which surrounds shaft 3 and carries a sprocket 17 that operates through suitable chain gearing 18 to rotate the hoist drum 5. I provide a manually operable clutch 21 that is adapted to lock the inner rotor and shaft 3 against rotation when it is desired to operate the motor for hoisting purposes only. One of the clutch members 22 is fixed upon, and rotates with, shaft 3, and the other clutch member 23 is integral with the motor housing.

Referring to Fig. 2, the primary winding 9 is energized from a suitable source of energy, such as three-phase conductors 25, 26 and 27, and the motor windings are connected in cascade relation, with resistors 28 in circuit with secondary winding 13 and primary winding 7, for controlling the motor in a manner to be hereinafter set forth.

For the normal drilling operation, the clutch 21 is disengaged, so that both of the rotors may operate freely. Squirrel-cage rotor 8 is restrained (through the hoist drum 5, etc.) by the weight of the tool 1 and is adapted to exert a predetermined torque or hoisting effort sufficient to balance or counteract a certain portion of the weight of said tool. The primary winding 9 under these conditions is stationary for the moment, and the inner rotor winding 13 cooperates therewith to effect rotation of the drilling tool. In other words, the windings 9 and 13 function as in the case of a single-speed wound-rotor induction motor.

Under ordinary drilling conditions, that is, when the tool 1 is being fed downwardly, the torque developed by primary winding 9 is not sufficient to actuate the rotor in the corresponding or "hoisting" direction, but functions to lighten or decrease the effective weight of the drill; that is, the pressure of the drill bit upon the bottom of the hole, in accordance with the resistance offered by the formation being drilled. In other words, the greater such resistance, the greater the current developed in winding 9 and the greater the torque exerted thereby tending to raise the drilling tool.

If, while drilling, sufficient resistance is encountered by the drill stem 1 and rotary table 2 to impose additional load on the motor, the voltage of rotor winding 13 correspondingly increases, to thereby raise the voltage impressed upon the outer stator winding 7, through transformer action above its normal value. This increased excitation, in conjunction with the increased torque of primary winding 9, adds to the torque output of the squirrel-cage rotor winding 8, imparting rotation to the corresponding rotor (carrying windings 8 and 9) for reversing the normal operation of the winding drum 5, in the event of very heavy load, and increasing the tension in the cable 4. In this manner, the unbalanced weight of the tool 1 is decreased to proportionately relieve the drilling pressure and thereby reduce the load imposed upon the tool and the several rotating elements. In the event of excessive drilling load, the outer rotor is thus inherently adapted to actually effect a retrieval or upward withdrawal of the tool. After the tool has cleared the obstruction, it automatically returns to its work and operates as previously described.

It will be appreciated that the illustrated cascade connection provides an electrical differential action, with respect to the rotors having the windings 9 and 13, thus tending to maintain a balanced relation between the pressure on the drilling tool and the power exerted to rotate the tool. Resistors 28 and switches 29 are provided in the cascade circuit for adjusting the drilling speed and for regulating the torque of the hoisting rotor winding 8. Of course, if resistance less than normal is met with while drilling, the effect is the opposite of that set forth above; that is, the effect is to permit the tool to be lowered and to increase the rate at which the drilling is accomplished, while maintaining substantially the normal drilling pressure. If drilling near the surface, when the weight of the tool is light, the phase rotation of winding 7 may be reversed, by means of reversing switch 7a, to insure sufficient drilling pressure. The problem at that stage is not to protect the drill pipe but to provide additional load. The effect is naturally the reverse of that previously described. Such, however, is not the normal operation with which I am chiefly concerned.

Speed-change gearing and clutch members 31 of suitable character, although not essential, may be employed to vary the gear reduction between the drum 5 and the rotor shaft 16. This provision is desirable, particularly in deep-well drilling, as the weight of the suspended pipe increases. In fact such an arrangement is commonly employed and need not be further described here.

When it is desired to cease drilling and hoist the tool from the well, the clutch 21 is manually engaged to lock the shaft 3 against rotation, whereupon the rotor 9, which is then the only active rotor, becomes effective for such hoisting operation.

Referring to Fig. 3, the illustrated arrangement embodies a modification of the system shown in Fig. 1. I employ a motor that is similar to the motor illustrated in Fig. 1 omitting, however, the stator winding 7 and the rotor winding 8. The mechanical arrangement of the system is otherwise the same, with the exception that I have provided an additional speed-reduction gearing with suitable clutch devices, all of which are illustrated in conventional form at 32. As illustrated, there are three independent speed reductions provided, so that, as the drill pipe is lengthened, the gear ratio may be changed to maintain the desired balanced relation between the weight of the suspended pipe and the torque exerted by the rotor element 9.

In accordance with this arrangement, the motor comprises substantially a single-speed induction-type machine having a rotatable primary member 9 and provided with the clutch device 21 for locking the primary member against rotation for the purpose of hoisting, as previously set forth.

Briefly, the difference in the operation of my invention with respect to Fig. 1 and Fig. 3 is that, according to Fig. 1, no change in gearing is essential during the drilling process. The additional drilling pressure at or near the surface is obtainable by reversal of the connections of the primary winding 7, as described. In accordance with the system of Fig. 3, however, a motor of simpler design is employed, together with the addition of any desired number of selected speed reductions between the rotor element 9 and the tool 1. The drilling pressure is thus varied by gear-shifting at different depths, as distinguished from the process of Fig. 1.

It will be appreciated that my invention embodies a mechanism that is comparatively compact and sufficiently automatic in operation to be readily controlled by an operator of ordinary skill. I have eliminated various mechanical devices heretofore employed in connection with differential rotary-drilling. Modifications of my invention may occur to those skilled in the art and I desire, therefore, to be limited only in accordance with scope of the appended claims.

I claim as my invention:

1. In a system of earth drilling, the combination of a drilling tool, a motor therefor, said motor having a primary winding, a rotor secondary winding cooperating therewith, means for operatively connecting said rotor to said tool, a second rotor operatively connected to said tool, and means for connecting said windings in cascade relation to control said tool.

2. In a system of earth drilling, the combination of a drilling tool, a motor therefor, said motor having a primary winding, a rotor secondary winding cooperating therewith, means for operatively connecting said rotor to rotate said tool, a second rotor operatively connected to said tool for effecting longitudinal movement of said tool, and means for connecting said windings in cascade relation to control said tool.

FREDERIC W. HILD.